United States Patent
Kaneko et al.

(10) Patent No.: US 6,331,250 B1
(45) Date of Patent: *Dec. 18, 2001

(54) METHOD AND EQUIPMENT FOR CHROMATOGRAPHIC SEPARATION

(75) Inventors: Kikuzo Kaneko; Takayuki Masuda; Fumihiko Matsuda; Kohei Sato; Kouji Tanikawa, all of Tokyo (JP)

(73) Assignee: Organo Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,560
(22) PCT Filed: Sep. 17, 1998
(86) PCT No.: PCT/JP98/04166
  § 371 Date: May 20, 1999
  § 102(e) Date: May 20, 1999
(87) PCT Pub. No.: WO99/15251
  PCT Pub. Date: Apr. 1, 1999

(30) Foreign Application Priority Data

Sep. 22, 1997 (JP) .................................................. 9-257055
Mar. 23, 1998 (JP) ................................................ 10-092225

(51) Int. Cl.[7] ................................................. B01D 15/08
(52) U.S. Cl. ..................... 210/635; 210/659; 210/198.2
(58) Field of Search .................................. 210/635, 656, 210/659, 198.2; 127/46.2

(56) References Cited

U.S. PATENT DOCUMENTS

| | | | |
|---|---|---|---|
| 4,808,232 | * 2/1989 | Beesley | 210/692 |
| 4,808,300 | * 2/1989 | Yao | 208/307 |
| 5,122,275 | * 6/1992 | Rasche | 210/659 |
| 5,273,820 | * 12/1993 | Beesley | 210/679 |
| 5,391,299 | * 2/1995 | Masuda | 210/659 |
| 5,482,631 | * 1/1996 | Saska | 210/635 |
| 5,730,877 | * 3/1998 | Heikkila | 210/659 |

FOREIGN PATENT DOCUMENTS

| | | | |
|---|---|---|---|
| 64-80409 | 3/1989 | (JP) | 210/659 |
| 6-39205 | 2/1994 | (JP) | 210/659 |
| 7-232003 | 9/1995 | (JP) | 210/659 |
| 8-136519 | 5/1996 | (JP) | 210/659 |
| 8-136520 | 5/1996 | (JP) | 210/659 |

OTHER PUBLICATIONS

Derwent Abstract of Japanese Patent 64–80409.

* cited by examiner

*Primary Examiner*—Ernest G. Therkorn
(74) *Attorney, Agent, or Firm*—Norris McLaughlin & Marcus (57) ABSTRACT

At least 2 different packings differing in the resolution of components contained in a starting fluid material such as a starting solution material and desired to be separated are used in a coexistent state to adjust the resolution of the components. The starting fluid material is flowed through the resultant packing bed to effect chromatographic separation, whereby high-purity fractions enriched with respective components can be obtained at high recoveries with a small amount of desorbent such as eluent. In a chromatographic separator, at least 2 packings comprising a first packing high in the resolution of a component having a medium affinity (affinity for packing) and a weak-affinity component and a second packing high in the resolution of a strong-affinity component and the medium-affinity component in a coexistent state are used as chromatographic packing in contact with a fluid containing the medium-affinity component to adjust the resolution of every two of at least 3 components, whereby at least 3 fractions can be obtained.

6 Claims, 2 Drawing Sheets

METHOD AND EQUIPMENT FOR CHROMATOGRAPHIC SEPARATION

REFERENCE TO RELATED APPLICATIONS

This application is a 371 of PCT/JP98/04166 filed Sep. 17, 1998.

TECHNICAL FIELD

The present invention relates to chromatographic separation process and separator, and more particularly to chromatographic separation process and separator for separating a starting fluid material containing at least 2 components into at least 2 fractions enriched with respective components separated therefrom. Herein, the term "enriched with components" refers to gathering of components to be separated (components desired to be separated) in the respective fractions separated in the direction of fluid flow, and the degree of enrichment is therefore correlated with purity and/or recovery.

BACKGROUND ART

There are various conventional methods of chromatographic separation of a starting fluid material containing at least 2 components into the respective components, several representative examples of which include the following methods:

A method (1) is a batchwise one wherein analytical high-performance liquid chromatography is scaled up, and which is generally called preparatory chromatography.

A method (2) is one wherein 2 fractions are obtained from a starting fluid material using a standard simulated moving bed seperator as disclosed in Japanese Patent Publication No. 15,681/1967.

A method (3) is one wherein use is made of an improved simulated moving bed separator, and examples of which include a process comprising a circulation step of simply moving fluid in the downstream direction thereof through a packing bed without fluid feed and fluid withdrawal as disclosed in Japanese Patent Laid-Open No. 49,159/1990 (Japanese Patent Publication No. 46,097/1995) and a process comprising 3 steps including 2 respective steps of separately withdrawing extract and raffinate as disclosed in Japanese Patent Laid-Open No. 100,459/1991. These processes are those wherein 2 fractions are obtained from a starting fluid material.

On the other hand, several representative examples of conventional chromatographic separation methods of separating a starting fluid material containing at least 3 components into at least 3 fractions enriched with respective components include the following methods:

A method (4) is one using either 2 simulated moving bed chromatographic separators for separation of only 2 components or using such a separator twice as disclosed in Japanese Patent Laid-Open No. 124,895/1990. More specifically, a starting solution material is either first separated into a component A and a mixture of components B+C, followed by separation of the mixture of components B+C into the components B and C, or first separated into a mixture of components A+B and the component C, followed by separation of the mixture of components A+B into the components A and B. This is so because separation of only 2 components is possible with an ordinary simulated moving bed chromatographic separator. Thus, in order to actually separate 3 components from one another, either 2 simulated moving bed chromatographic separators must be prepared or one such separator must be used twice. In the latter case, a solution midway of separation (fraction of mixture) must be stored once, followed by using the same separator again under varied conditions.

A method (5) is one disclosed in Japanese Patent Laid-Open No. 227,804/1992, wherein a starting fluid material containing at least 3 components is efficiently and continuously separated into fractions enriched with the respective components with one altered simulated moving bed chromatographic separator packed with one kind of packing (chromatographic packing) by repeating the step of withdrawing a fraction enriched with a component having a medium affinity for packing while feeding desorbent and the starting fluid material and the step of withdrawing fractions respectively enriched with components having respective weak and strong affinities for packing while feeding desorbent.

A method (6) is one disclosed in Japanese Patent Laid-Open No. 232,003/1995, wherein at least 3 fractions are separated from one another with a simulated moving bed separator comprising 4 packing bed units and packed with one kind of packing by repeating the step of withdrawing fractions respectively enriched with components having respective weak and medium affinities for packing while feeding eluent and a starting solution material, the step of circulating liquid in the simulated moving bed without liquid feed and withdrawal, and the step of withdrawing a fraction enriched with a component having a strong affinity for packing while feeding eluent.

A method (7) is one disclosed in Japanese Patent Laid-Open No. 80,409/1989, wherein use is made of an arrangement of separation columns (packed column units having packing bed units) packed with a first packing having the following partition coefficients for components: component A<component B<component C, alternate with separation columns packed with a second packing having the following partition coefficients for components: component A<component C<component B.

The foregoing methods (2) to (7) are fundamentally those whereto application is made either of a standard simulated moving bed procedure comprising an operation of feeding a starting fluid material containing a plurality of components to be separated and desorbent (also called "eluent" in the case of liquid) at respective designated positions to an endless circulation system made up of a plurality of packing bed units packed with chromatographic packing (sorbent such as adsorbent) and linked endlessly for circulation in one direction through the endless circulation system, and withdrawing fractions from zones enriched with respective components out of the endless circulation system while taking advantage of a phenomenon that a plurality of components to be separated are separated into respective zones enriched with the respective components due to a difference between the components in affinity for chromatographic packing, and an operation of intermittently displacing the starting fluid material and desorbent feed positions as well as the fraction withdrawal positions in the direction of fluid flow as if the packing were apparently moved in the direction opposite to that of fluid flow, whereby two fractions enriched with the respective components are continuously obtained from the starting fluid material; or of a procedure of obtaining 2 fractions or at least 3 fractions, which is improved over or altered from the standard simulated moving bed procedure (in the present invention, the "simulated moving bed procedure" is regarded as also encompassing those improved over or altered from the standard simulated moving bed procedure).

Meanwhile, although all the foregoing methods are of the same technology in respect of chromatographic separation of a starting fluid material containing at least 2 components into at least 2 fractions, they involve the following respective problems, or demerits, when they are adopted in industrial-scale equipment for carrying out the separation technology.

The method (1) is poor in separation because it is batchwise, and involves a problem that it is often unfit for industrial-scale separation involving treatment of a large amount of starting solution material because a large amount of eluent must be used.

In the foregoing methods (2) to (7), the separation performance, i.e., the separability of components [relevant to the load (feed rate) of a starting fluid material], the purities and recoveries of components contained as objects of recovery in recovered fractions, the amount of used desorbent, such as eluent, relevant to concentration energy in the later step of concentrating recovered fractions (relevant to the desired component concentrations of the recovered fractions), etc. are generally influenced by packing packed in packing bed units (bed units packed with packing), while involving a problem that a countermeasure for an improvement in respect of one of those influences tends to produce other adverse effects.

The foregoing methods (4) to (7) in particular for separation of at least 3 fractions involve the following specific problems:

The method (4) requires either installing 2 simulated moving bed chromatographic separators or using the same separator twice. Installing 2 simulated moving bed chromatographic separators involves a problem that the equipment cost is increased. Where the same separator is used twice, the same packing must inevitably be used because replacing the packing every time is troublesome in an aspect of operation. This involves a problem that all 3 components cannot efficiently be separated from one another in some cases because of one kind of packing. For example, there arises a case where a component A is too well separated from a component B, but separation of the component B from a component C is so poor that the component purities of fractions are not heightened.

The methods (5) and (6) also involve a problem that there arises a case where all 3 components cannot efficiently be separated because of one kind of packing. For example, there arises a case where a component A is too well separated from a component B, but separation of the component B from a component C is so poor that the component purities of fractions are not heightened.

The method (7) involves a problem that a difficulty is encountered in combining 2 kinds of suitable packings for a starting solution to be subjected to chromatographic separation.

Although it can be said that choice and use of the optimum packing capable of suitably adjusting the foregoing various influences will suffice in order to solve such problems, choice of the optimum packing is not easy as a matter of fact. For example, when the resolution, by packing, of a plurality of components contained in a starting fluid material is enhanced as much as possible in order to heighten the purities and recoveries of components as objects of recovery, intervals between a plurality of zones enriched with respective components are spread too broad in the endless circulation system, whereby the amount of desorbent to be used is increased (the amount of desorbent to be used for desorption of a strong-affinity component in particular is increased because of a large difference between components in affinity for packing), leading to a problem that the component concentrations of respective recovered fractions are lowered. On the other hand, using packing poor in resolution for the purpose of decreasing the amount of desorbent to be used involves a problem that the purities and recoveries of components are lowered. Thus, the chances are rare that there exists any conventional packing suitable in respect of the resolution of a plurality of components to be separated, and creation of a novel packing of that kind is not easy.

Incidentally, the term "resolution," which is a yardstick indicative of the extent of separation of 2 components, is defined as being equal to a value found by dividing the distance between the centers of two adjacent enriched zones (bands) 1 and 2 by an average band width (see "High-Performance Liquid Chromatography" published by Tokyo Kagaku Dozin Co., Ltd. in 1976).

An object of the present invention, which has been made in view of the foregoing problems of the conventional technologies, is to provide process and equipment for efficiently separating components from a starting fluid material containing at least 2 components in chromatographic separation of the components.

DISCLOSURE OF THE INVENTION

As a result of extensive investigations on the foregoing prior art methods, the inventors of the present invention have solved the problems of the conventional chromatographic separation methods to complete the present invention. According to the present invention, in batchwise or simulated moving bed chromatographic separation, for example, there can simultaneously be satisfied antinomic requirements that high purity and high recovery of at least one component separated as an object of recovery be secured though the amount of desorbent can be decreased, and that said at least one component separated as the object of recovery be obtained while securing as high its concentration as possible in a fraction enriched with that component. Incidentally, at least one other fraction may be either a fraction enriched with other component separated as another object of recovery, or a fraction having said at least one component as the object of recovery either sharply lowered in content or scarcely contained therein, and enriched with a component including impurities and the like other than the component separated as the object of recovery.

Specifically, the present invention provides a chromatographic separation process characterized in that at least 2 different packings differing in the resolution of at least 2 components contained in a starting fluid material and to be separated are combined in a coexistent state for use as chromatographic packing to form a packing bed having an adjusted resolution of said at least 2 components to be separated, and in that the starting fluid material is passed through the packing bed to separate therefrom fractions enriched with respective components.

According to the present invention, the resolution of components to be separated by chromatographic packing as a whole across a chromatographic separator can be adjusted by placing at least 2 different packings differing in the resolution of components to be separated in a coexistent state in the separator for forming the packing bed, whereby a component(s) to be separated as an object(s) of recovery can be separated in a short time with a small amount of desorbent.

In connection with chromatographic separation wherein a starting fluid material containing at least 3 components differing in "affinity for chromatographic packing" (hereinafter often referred to simply as "affinity") and ranging from a strong-affinity component to a weak-affinity component is passed through a packing bed to separate said at least 3 components into at least 3 fractions, the present invention also provides a chromatographic separation process characterized in that at least 2 packings differing in the resolution of the components are used as chromatographic packing in contact with a fluid containing a medium-affinity component at least between the position of feeding the starting fluid material to the packing bed and the position of withdrawing the medium-affinity component from the packing bed between which positions at least a first packing high in the resolution of the medium-affinity component and the weak-affinity component and a second packing high in the resolution of the strong-affinity component and the medium-affinity component are combined in a coexistent state to adjust the resolutions of the components. This process is a chromatographic separation process favorable for a case where a starting fluid material containing at least 3 components is separated into at least 3 fractions enriched with respective components.

According to this process of the present invention, the resolutions of the components to be separated by chromatographic packing can be adjusted as a whole across a chromatographic separator at least between the position of feeding the starting fluid material to the packing bed and the position of withdrawing the medium-affinity component from the packing bed, whereby components to be separated as the objects of recovery can be separated sufficiently as needed. In order to facilitate the understanding of this, the simplest case where 2 packings are used in separation of 3 components will be described as a representative example. For example, when 3 components A, B and C (component A: weak-affinity, component B: medium-affinity, component C: strong-affinity) are such that the separating performance of the first packing by which the components A and B are well separated but the components B and C are poorly separated is expressed as "A–BC" and the separating performance of the second packing by which the components A and B are poorly separated but the components B and C are well separated is expressed as "AB–C," it has been found out that a separating performance "A–B–C" can be attained if these packings are combined in a coexistent state at a proper proportion, whereby the 3 components A, B and C can be separated sufficiently as needed. In this case, providing such a coexistent state at least between the position of feeding the starting fluid material to the packing bed and the position of withdrawing the medium-affinity component from the packing bed will suffice because the problem is separation of the component B from the component A and separation of the component B from the component C.

Any packings will suffice as such packings in so far as they can separate, for example, 3 components A, B and C contained in a starting fluid material from one another sufficiently as needed when they are at least 2 packings combined in a coexistent state and including, for example, a packing more effective in separation of the components A and B and a packing more effective in separation of the component B and C.

In the present invention, the term "at least 2 different packings differing in the resolution" refers to those involving a difference between 2 packings in the resolution of 2 components to be separated from each other when the resolution of the 2 components to be separated by each packing is measured under actual separation conditions (temperature, flow velocity, etc.), for example, for 2 packings packed in respective test columns having the same shape at a standard packing bed height [e.g., 0.3- to 1-fold of actual bed height of packed column (unit)] in the simplest case. What difference in resolution will suffice cannot generically be said since it differs depending on the kinds of components to be separated, the materials of packings, etc. In general, however, a difference of at least 0.1, preferably at least 0.2, in resolution will suffice. Herein, the term "at least 2 different packings" means at least 2 packings differing in resolution, examples of combination of which include a combination of 2 packings: a packing involving better separation than a desired degree of separation of components (e.g., 2 components A and B) contained in a starting fluid material and a packing involving poorer separation than that desired degree of separation, and a combination of at least 3 packings including such 2 packings. Any combination of at least 2 packings will suffice when desired separation of components (necessary and sufficient separation of components) can be secured as a result of a coexistent state of these packings.

In the present invention, the "coexistent state of at least 2 different packings combined and differing in the resolution of at least 2 components to be separated" can be materialized, for example, by placing said at least 2 packings either in a mixed state in the packing bed or in a stratified state in the packing bed.

Alternatively, the packing bed may be constituted by connecting a plurality of packing bed units, and at least one packing of said at least 2 different packings may be singly used in at least one packing bed unit, so that a coexistent state of said at least 2 packings can be materialized when the packing bed is viewed as a whole.

The procedure of preparing such a coexistent state will be specifically described by taking as an example a procedure of preparing such a coexistent state in the simplest case where the packings are 2 packings (at least a first packing high in the resolution of medium-affinity and weak-affinity components and a second packing high in the resolution of strong-affinity and medium-affinity components in the aforementioned preferred chromatographic separation process for separating a starting fluid material containing at least 3 components into at least 3 fractions enriched with respective components). Various examples of the procedure can be mentioned, which include a case where the 2 packings are mixed with each other and then packed in the packing bed [unit(s)], a case where a certain packing is first packed in the packing bed [unit(s)], followed by packing thereover the other packing in a stratified state, or that other packing is inversely first packed in the packing bed [unit(s)], followed by packing thereover that certain packing in a stratified state, a case where the 2 packings are alternately packed in the form of at least 3 layers in the packing bed [unit(s)], and a case where the 2 packings, after mixed, are packed in at least one bed of a plurality of packing beds in the cases where packing is done in a stratified state. In the case of at least 3 packings, similar examples of procedure and combinations thereof can be adopted.

From the standpoint of simplicity of actual operation, preferred is a method wherein at least one packing of at least 2 packings is singly packed in at least one packing bed unit. In this case, the packing operation of packing said at least one packing bed unit with said at least one packing, and the operation of regenerating and replacing the packing and so on are simplified. For the same reason, a method involving no mixing of packings is of course further preferred, which may be a method wherein a certain packing bed unit(s) is packed with a certain packing alone and other packing bed unit(s) is packed with other packing alone.

As a result of proper adjustment of the resolution(s) of at least 2 components to be separated due to such a coexistent state of at least 2 packings, a short-time separation treatment can be realized using a small amount of desorbent such as eluent, and a desired component(s) can be obtained in a high purity and/or at a high recovery.

When at least 2 packings differing in resolution are thus used in a coexistent state, the ratio, kinds, etc. of packings can be chosen in accordance with the kinds of components to be separated, the purpose, etc. on the basis of various experimental results.

Although the present invention can usually be effectively carried out using 2 packings, a case where at least 3 packings are used is not excluded as a matter of course.

Examples of packings usable in the present invention include ion exchange resins, zeolite, silica gel, activated carbon, and other natural or synthetic sorbents (adsorbents and the like). In the case of an ion exchanger such as an ion exchange resin or zeolite, the ionic form composition thereof may be a mixed ion form of at least 2 kinds of ions. In the present invention, at least 2 suitable packings may be selected from among a large number of packings including packings differing in material and packings substantially the same in material but differing in ionic form (in the case of ion exchangers) and/or internal micropore size in accordance with the purpose of chromatographic separation.

In most cases, the several twos of various components to be separated are mutually different in resolution by a strongly acidic cation exchange resin between the monovalent ion form and bivalent ion form thereof. Since the ionic form of the strongly acidic cation exchange resin can be easily varied, it is favorable that one of at least 2 packings be the strongly acidic cation exchange resin in a monovalent ion form and another be the strongly acidic cation exchange resin in a bivalent ion form.

For example, in chromatographic separation of saccharides, use is made of a gel type strongly acidic cation exchange resin in a monovalent ion form (potassium form, sodium form, mixed form thereof, or the like) or in a bivalent ion form (calcium form, magnesium form, mixed form thereof, or the like). Among these, suitable ionic forms may be selected and combined, whereby a coexistent state of at least 2 packings can be materialized. Incidentally, according to empirical laws, the cation exchange resin in a monovalent ion form is so suitable for separation of monosaccharides and disaccharides and/or trisaccharides, etc. on the basis of a difference therebetween in molecular weight that an aqueous solution of a salt such for example as sodium chloride may desirably be brought into contact with the cation exchange resin to increase the amount of the monovalent ion form, while the cation exchange resin in a bivalent ion form is so suitable for mutual separation of saccharides having the same molecular weight that an aqueous solution of a salt such for example as calcium chloride may desirably be brought into contact with the cation exchange resin to increase the amount of the bivalent ion form.

When an ion exchanger is used as a packing, reagents for changing the original ionic form of e.g., a cation exchange resin to convert it into a desired ionic form include various acids (changing it to the H form); salts and hydroxides of alkali metals such as sodium and potassium as well as ammonium, and mixtures thereof, which can change the ionic form to a monovalent ion form; and salts and hydroxides of alkaline earth metals such as calcium and magnesium, and mixtures thereof which can change the ionic form to a bivalent ion form. Examples of other reagents include aluminum chloride and the like, which can change the ionic form to a trivalent ion form. A proper reagent may be chosen in connection with components to be separated. Since a smaller amount of such a reagent is advantageous in aspects of expense, time, etc., it is preferred either to change the ionic form of the ion exchanger in a minimum amount or to change the ionic form at a minimum proportion ("changed ionic form/whole ionic form ratio" based on the ion exchange capacity of the ion exchanger) even if the whole ion exchanger is changed in ionic form.

Where an ion exchanger is used as at least one of 2 or more packings for an operation of chromatographic separation of a water-based or like starting solution material as the starting fluid material in the present invention, chromatographic separation is preferably effected under such conditions that the ionic form composition of the ion exchanger is not substantially varied in keeping with the progress of chromatographic separation operation in order to maintain the coexistent state of the 2 or more packings stable and keep the resolution constant in an aspect of securing a stable separability with time. Accordingly, in such a case, it is preferred to effect chromatographic separation under such conditions that the solution being subjected to separation treatment is not substantially varied in ionic form composition from the starting solution material. Incidentally, in separation of saccharides with 2 ionic forms of an ion exchange resin used as 2 packings, however, either a case where the ionic forms thereof go in such a direction as to approach the mixed ion form composition equilibrated with various kinds of ions contained in the starting solution material or a case where some ions of the 2 ionic forms of the ion exchange resin move to a next stratified packing bed or a next packing bed unit may arise in keeping with progress of operation. Even in such a case, however, no problems arise in so far as the 2 ionic forms of the ion exchange resin exist in a coexistent state thereof at least in amounts necessary for separation per total amount of the ion exchange resin in the whole packing bed.

The process of the present invention may be carried out either according to a batchwise preparatory chromatographic separation procedure or according to a simulated moving bed chromatographic separation procedure. Accordingly, in the present invention, use can be made of various chromatographic separators such as a batchwise preparatory chromatographic separator, a standard simulated moving bed chromatographic separator for continuously obtaining 2 fractions, and simulated moving bed chromatographic separators improved over or altered from the standard simulated moving bed chromatographic separator for continuously obtaining 2 fractions or at least 3 fractions. These separators can be used as such, provided that at least 2 packings differing in resolution are placed therein in a coexistent state. Incidentally, every packed column unit made of a column packed with packing in a simulated moving bed chromatographic separator may have either one packing bed unit or at least 2 packing bed units formed by partitioning the packed column unit wherein each packing bed unit may be provided with a starting fluid material feed means, a desorbent feed means, and a plurality of fluid fraction withdrawal means if necessary.

In a batchwise preparatory chromatographic separator, the resolution of components to be separated by chromatographic packing can be adjusted, for example, by one mixed packing bed, a stratified structure of a plurality of packings or a combination thereof (i.e., a stratified packing structure including at least one bed packed with mixed packings)

formed in a tower (column) from at least 2 packings differing in the resolution(s) of the components to be separated (including at least a first packing high in the resolution of medium-affinity and weak-affinity components and a second packing high in the resolution of strong-affinity and medium-affinity components in the aforementioned preferred chromatographic separation procedure of separating a starting fluid material containing at least 3 components into at least 3 fractions enriched with respective components). Alternatively, there may be adopted a method wherein a plurality of packing bed units are linked with each other to form a packing bed having at least one packing bed unit packed singly with at least one packing of at least 2 packings. In this case, the packing operation of packing said at least one packing bed unit with said at least one packing and the operation of regenerating and replacing the packing and so on can favorably be simplified as described before. As a result of proper adjustment of the resolution(s) of 2 or at least 3 components to be separated due to such a coexistent state in which at least 2 packings are placed, a short-time separation treatment can be realized using a small amount of desorbent such as eluent, and a desired component(s) can be obtained in a high purity and/or at a high recovery.

Additionally stated, where a batchwise preparatory chromatographic separator having a stratified packing structure wherein packings are stratified in the form of, e.g., 2 beds is used to obtain, for example, 3 fractions enriched with respective components, a starting fluid material may be first flowed from the upstream end of the first bed, and a first fraction of mixture A+B outflowing from the first bed due to subsequent desorbent feed may be passed as such through the second bed to sequentially withdraw separated fractions A and B from the downstream end of the second bed while withdrawing a fraction C from the boundary between the first and second beds. In this case, a desorbent feed inlet may also be provided at the boundary between the first and second beds, or a plurality of withdrawal outlets capable of switching the position of the boundary between the first and second beds may be provided around the boundary to be favorably able to cope with various operating conditions and various starting fluid materials.

In the present invention, use can be made of various simulated moving bed chromatographic separators for separation of at least 3 components, for example, as disclosed in Japanese Patent Laid-Open No. 132,586/1997, Japanese Patent Laid-Open No. 80,409/1989, Japanese Patent Laid-Open No. 227,804/1992, Japanese Patent Laid-Open No. 367,701/1992, etc. These separators can be used as such, provided that at least 2 packings differing in resolution are placed therein in a coexistent state.

The process of the present invention is preferably applied to a simulated moving bed chromatographic separation procedure in order to effect industrial separation for treating a large amount of a starting fluid material. When 2 fractions are to be obtained in this case, the present invention provides a chromatographic separation process for simulated moving bed chromatographic separation comprising a separation operation of feeding a starting fluid material and desorbent to a system of the group of a plurality of packing bed units formed by endlessly linking the packing bed units packed with chromatographic packing, and flowing them in one direction to separate in the direction of fluid flow a component having a weak affinity for chromatographic packing (hereinafter often referred to simply as "affinity") and a component having a strong affinity as components to be separated, an operation of withdrawing fractions enriched with the respective components by the separation operation from the system, and an operation of intermittently displacing the positions of feeding the starting fluid material and desorbent and the positions of withdrawing the fractions in the direction of fluid flow for apparently moving the chromatographic packing in the direction opposite to that of fluid flow; characterized in that at least 2 different packings differing in the resolution of the components to be separated are combined in a coexistent state for use as the chromatographic packing, and in that the weak-affinity component and the strong-affinity component contained in the starting fluid material fed to the system are withdrawn from the system after they are each brought into contact with all of said at least 2 different packings. In this process, said at least 2 packings differing in the resolution of the components to be separated may be mixed or stratified to form each packing bed unit. Alternatively, said plurality of packing bed units may be packed separately with different packings, whereby a coexistent state of at least 2 packings can be attained when the system of the group of the packing bed units is viewed as a whole. In this case, the operation of packing the packings, the operation of regenerating and replacing the packings and so on can favorably be simplified as described before. Of course, at least 2 different packings may be mixed or stratified in at least one packing bed unit with the other packing bed units packed separately with different packings.

Where the packing bed units are packed separately with different packings in this process, the system of the group of the packing bed units through which the starting fluid material is flowed is preferably constituted in such a way that packing bed units packed singly with one packing are arrayed alternately with those packed singly with a different packing in the direction of fluid flow, whereby the components contained in the starting fluid material and to be separated are brought into contact with both of the packings without fail during flow across a plurality of packing bed units to acquire a desired degree of separation.

In order to facilitate the understanding of this process, a simple description will be made of the basic operations of a standard simulated moving bed chromatographic separation process for separation of 2 components. The group of the packing bed units linked endlessly as described hereinabove is regarded as being divided into first, second, third and fourth sections in the downstream direction when viewed from the desorbent feed position. Desorbent such as eluent is fed via a feed valve to the circulating flow at the inlet of a packing bed unit positioned foremost in the first section and a fluid fraction C high in the sorbed component content is withdrawn via a withdrawal valve from the circulating flow at the outlet of a packing bed unit positioned rearmost in the first section, while a starting fluid material is fed via a feed valve to the circulating flow at the inlet of a packing bed unit positioned foremost in the third section and a fluid fraction A little in the sorbed component is withdrawn from the circulating fluid at the outlet of a packing bed unit positioned rearmost in the third section. The desorbent feed position, the fraction C withdrawal position, the starting fluid material feed position, and the fraction A withdrawal position are each operationally displaced in the downstream direction in step with the movement of a zone wherein the component in the starting fluid material is sorbed on sorbent (chromatographic packing such as adsorbent).

When the process of the present invention is applied to a simulated moving bed chromatographic separation procedure of obtaining at least 3 fractions, the present invention also provides a chromatographic separation process for altered simulated moving bed chromatographic separation comprising Step 1 comprising an operation of substantially shutting off fluid circulation in at least one position (shutoff/opening position) of the circulating flow path of a system of the group of a plurality of packing bed units packed with chromatographic packing and linked endlessly for formation of the circulation flow path, in said at least one shutoff/opening position of which an interchange can be made between a state wherein fluid is endlessly circulated through the circulation flow path with external fluid feed thereinto and outward fluid withdrawal therefrom and a state wherein fluid circulation is substantially shut off with external fluid feed thereinto and outward fluid withdrawal therefrom, and feeding a starting fluid material to a packing bed unit closest to said at least one shutoff/opening position on the downstream side thereof to flow it in one direction while withdrawing a fraction enriched with a medium-affinity component contained in the starting fluid material out of the system, and Step 2 comprising an operation of withdrawing fractions enriched with components other than the medium-affinity component out of the system while feeding desorbent and flowing it in one direction and an operation of intermittently displacing the position of feeding the desorbent and the positions of withdrawing the fractions enriched with the components other than the medium-affinity component in the direction of fluid flow for apparently moving the chromatographic packing in the direction opposite to that of fluid flow; characterized in that at least 2 different packings differing in the resolution of components to be separated are combined in a coexistent state for use as the chromatographic packing at least between the position of feeding the starting fluid material and the position of withdrawing the fraction enriched with the medium-affinity component. The same various examples of procedure as described above can be adopted as the method of packing the packing bed units with at least 2 packings.

The present invention further provides a batchwise chromatographic separator characterized by comprising a packing bed packed with at least 2 different packings placed in a coexistent state and selected from among those differing in the resolution of components contained in a starting fluid material and to be separated for adjusting the resolution of the components by chromatographic packing, fluid feed means for feeding the starting fluid material and desorbent at the initial end of the packing bed, and fluid recovery means for recovering fractions enriched with the separated components and discharged from the terminal end of the packing bed.

According to this equipment invention, the resolution of the components to be separated is adjusted as a whole by said at least 2 different packings across the packing bed formed by packing it with the packings, with the result that a short-time separation treatment can be realized using a small amount of desorbent such as eluent, and a high-purity and/or high-recovery separation treatment can also be realized.

Further, the present invention provides a simulated moving bed chromatographic separator comprising a fluid circulation system made up of the group of a plurality of packing bed units formed by endlessly linking the packing bed units packed with chromatographic packing, fluid feed means for feeding a starting fluid material and desorbent to the fluid circulation system and thereby flowing fluid in one direction in the fluid circulation system, fluid withdrawal means for withdrawing, out of the fluid circulation system, fractions enriched with a weak-affinity component and a strong-affinity component separately in the direction of fluid flow by fluid circulation, and a control means for intermittently displacing the positions of fluid feed and the positions of fluid withdrawal in the direction of fluid flow for apparently moving the chromatographic packing in the direction opposite to that of fluid flow; characterized in that at least 2 different packings differing in the resolution of the weak-affinity component and the strong-affinity component contained in the starting fluid material are combined in a coexistent state for use as the chromatographic packing.

As described before, where packing bed units are packed separately with different packings in this separator, the system of the group of the packing bed units through which the starting fluid material is flowed is preferably constituted in such a way that packing bed units packed singly with one packing are arrayed alternately with those packed singly with a different packing in the direction of fluid flow, whereby the components contained in the starting fluid material and to be separated can be brought into contact with both of the packings without fail during flow across a plurality of packing bed units to acquire a desired degree of separation.

According to this equipment invention, the resolution of the components to be separated is adjusted as a whole by said at least 2 different packings across the fluid circulation system formed by endlessly linking a plurality of bed units packed with packing, with the result that short-time chromatographic separation with a small amount of desorbent such as eluent as well as high-purity and/or high-recovery chromatographic separation can be realized while increasing the load of the starting fluid material on the separator.

Furthermore, the present invention provides a simulated moving bed chromatographic separator comprising a system of the group of a plurality of packing bed units packed with chromatographic packing and linked endlessly for formation of a circulation flow path, in at least one position (shutoff/opening position) of which an interchange can be made between a state wherein fluid is endlessly circulated through the circulation flow path with external fluid feed thereinto and outward fluid withdrawal therefrom and a state wherein fluid circulation is substantially shut off with external fluid feed thereinto and outward fluid withdrawal therefrom, a starting fluid material feed means connected to the circulation flow path for feeding a starting fluid material to a packing bed unit closest to said at least shutoff/opening position on the downstream side thereof, desorbent feed means connected to the circulation flow path for feeding desorbent to the packing bed units, fluid withdrawal means connected to the circulation flow path for respectively withdrawing 2 fluid fractions from the packing bed units, and a fluid withdrawal means connected to the circulation flow path on the upstream side of said at least one shutoff/opening position with no and/or one packing bed unit therebetween for withdrawing one other fluid fraction; characterized in that at least 2 different packings differing in the resolution of components contained in the starting fluid material are combined in a coexistent state for use as the chromatographic packing at least between the position of the means for feeding the starting fluid material and the position of the means for withdrawing the one other fraction. While using this chromatographic separator, at least 3 fractions enriched with respective components can also be obtained from a starting fluid material containing at least 3 components according to an altered simulated moving bed procedure.

Although the present invention is described mainly in connection with a case where a liquid containing 2 or at least 3 components is treated as the starting fluid material for simplifying the explanation in the instant description, it goes without saying that the present invention is applicable to gases containing 2 or at least 3 components.

MODES FOR CARRYING OUT THE INVENTION

Embodiments of the present invention will now be described while referring to the drawings, but, of course, should not be construed as limiting the scope of the present invention unless they depart from the subject matter of the present invention.

Embodiment 1

Figure 1:
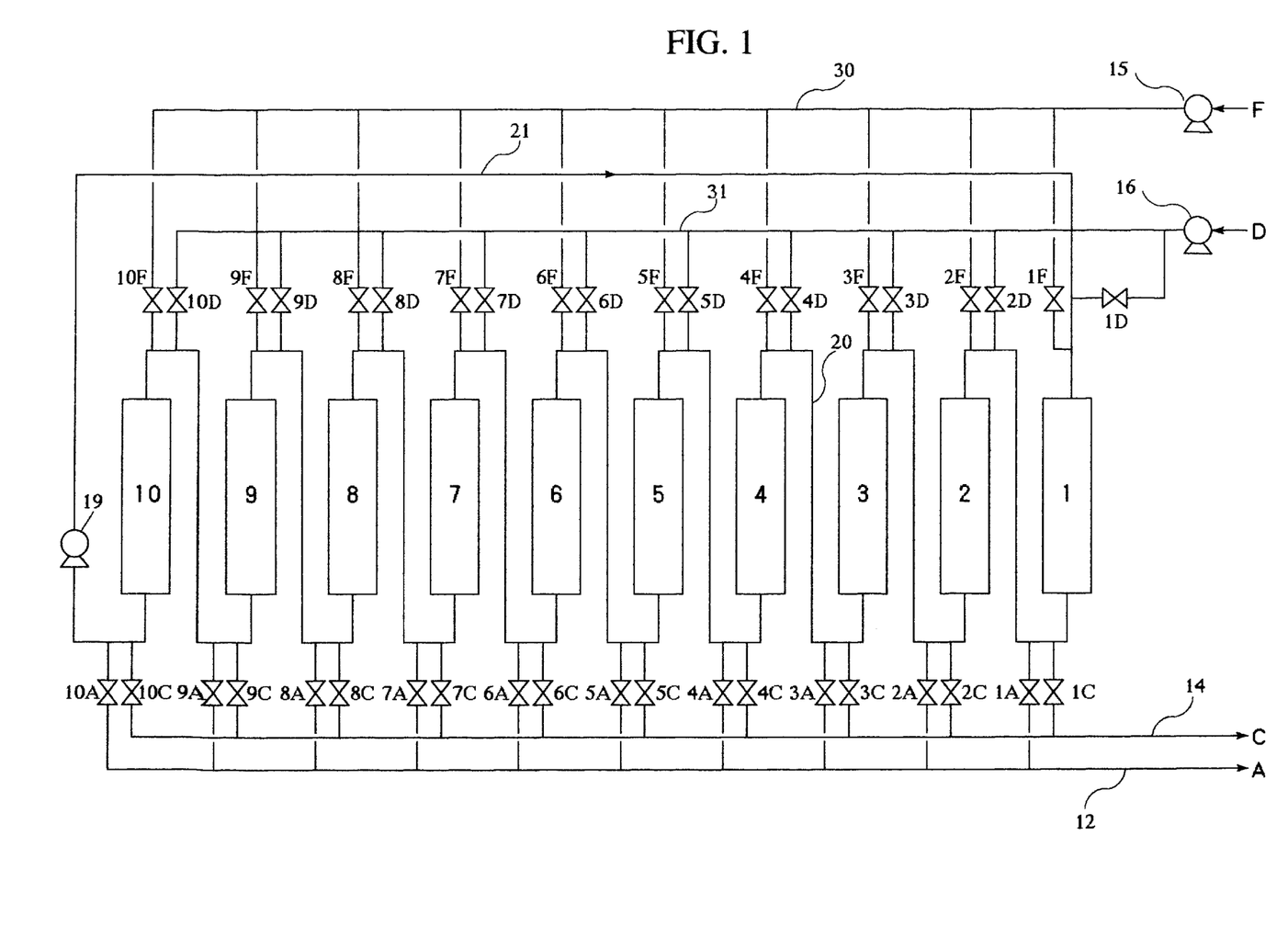
FIG. 1 is a schematic illustration of an example of the constitution of a combination type simulated moving bed chromatographic separator capable of batchwise separation as well as simulated moving bed separation of 2 components.

FIG. 1 is a schematic illustration of the constitution of an example of a combination type simulated moving bed chromatographic separator capable of batchwise separation as well as simulated moving bed separation of 2 components.

In this separator of FIG. 1, packing bed units 1 to 10 are each packed with packing to form packed column units. In this Embodiment, for example, packing bed units 1, 3, 5, 7 and 9 are packed with a certain packing, while packing bed units 2, 4, 6, 8 and 10 are packed with other packing differing from the above-mentioned packing in the resolution of components to be separated, whereby the packing bed units are arrayed alternately with each other in connection with the 2 different packings. These packing bed units 1 to 10 are linked in series to permit sequential fluid flow therethrough via a piping 20 connected thereto, and the end of the rearmost packing bed unit 10 is connected to the foremost packing bed unit 1 via a piping 21 as a fluid path to form an endless circulation system as a whole.

Incidentally, a circulating pump 19 is provided in the middle of the fluid path piping 21 to flow fluid in one direction indicated by arrows in the figure in the circulation system. Additionally stated, the flow rate of fluid can be controlled to any set points by means of a controller not shown in the figure. Such a pump 19 may be provided between any packing bed units, and whatever number of such pumps may be provided as needed.

Fluid feed means for feeding a starting fluid material F and desorbent D such as eluent to the circulation system via the tops (initial ends) of the packing bed units are connected with the pipings 20 and 21 between every adjacent packing bed units of the endless circulation system. More specifically, the pipings 20 and 21 between the packing bed units are each connected with a common starting fluid material feed piping 30 via feed valves 1F to 10F for the starting fluid material F, while the starting fluid material feed piping 30 is connected to a staring fluid material feed pump 15. Further in the same way, the pipings 20 and 21 between the packing bed units are each connected with a common desorbent feed piping 31 via desorbent feed valves 1D to 10D, while the desorbent feed piping 31 is connected to a desorbent feed pump 16.

Fluid withdrawal means for withdrawing fluids of fractions enriched with predetermined components from the ends (terminal ends) of the packing bed units out of the circulation system are connected with the pipings 20 and 21 between every adjacent packing bed units of the endless circulation system. More specifically, the pipings 20 and 21 between the packing bed units are each connected with a common fraction A withdrawal means 12 via withdrawal valves 1A to 10A for a fluid of fraction enriched with a weak-affinity component (hereinafter referred to as a "fluid fraction A"). Further in the same way, the pipings 20 and 21 between the packing bed units are each connected with a common fraction C withdrawal means 14 via withdrawal valves 1C to 10C for a fluid of fraction enriched with a strong-affinity component (hereinafter referred to as a "fluid fraction C"). Incidentally, in FIG. 1, A denotes the fluid fraction A and C denotes the fluid fraction C.

Meanwhile, each valve of the starting fluid material feed valves 1F to 10F, the desorbent feed valves 1D to 10D, the fluid fraction A withdrawal valves 1A to 10A, and the fluid fraction C withdrawal valves 1C to 10C are controlled to be opened or closed in accordance with a predetermined valve opening and closing sequence program by means of a controller not shown in the figure, thereby to perform an operation of simulated moving bed chromatographic separation (i.e., an operation of intermittently displacing the positions of fluid feed and the positions of fluid withdrawal as if packing were apparently moved in the direction opposite to that of fluid flow).

In the separator constructed in the foregoing way, the procedure of separating components contained in the starting fluid material and to be separated into respective fractions is carried out, for example, in the following manner:

In Stage 1, the starting fluid material F is first fed to the packing bed unit 6 via the starting fluid material feed valve 6F while simultaneously feeding desorbent D via the desorbent feed valve 1D. This separates the fluid fraction enriched with the weak-affinity component A (fluid fraction A) and the fluid fraction enriched with the strong-affinity component C (fluid fraction C) in the direction of circulating flow. Accordingly, the fluid fraction A is withdrawn via the fraction A withdrawal valve 8A, and the fluid fraction C is withdrawn via the fraction C withdrawal valve 2C.

In Stage 2, there is performed a next operation of sequentially displacing and shifting the positions of feeding the starting fluid material F and the desorbent D and the positions of withdrawing the fluid fraction A and the fluid fraction C one by one in the downstream direction in step with the movement of the respective enriched fractions. This moves the fluid fraction A in the downstream direction of circulating flow, while switching of valves works as if packing were apparently moved in the direction opposite to the circulating flow to apparently move the fluid fraction C in the upstream direction of circulating flow. Thus, the starting fluid material F is fed to the packing bed unit 7 via the starting fluid material feed valve 7F and desorbent is fed to the packing bed unit 2 via the desorbent feed valve 2D, while the fluid fraction A is withdrawn from the packing bed unit 9 via the fraction A withdrawal valve 9A and the fluid fraction C is withdrawn from the packing bed unit 3 via the fraction C withdrawal valve 3C.

Stages 3 to 10 of the same operation are performed to complete one cycle of the simulated moving bed chromatographic separation procedure. Of course, this procedure is usually repeated continuously through a plurality of cycles without termination after only one cycle thereof When a case of separation of saccharides with this separator is taken as an example, it is preferred according to this Embodiment 1 that the packing bed units 1, 3, 5, 7 and 9 be packed with a strongly acidic cation exchange resin in the Na form, and the packing bed units 2, 4, 6, 8 and 10 be packed with a strongly acidic cation exchange resin in the Ca form, whereby there can be provided an alternately arrayed structure of packing bed units each packed with one of 2 different packings differing in resolution due to a difference therebetween in the ionic form.

Incidentally, the number of packing bed units is 10 in FIG. 1, but is not limited thereto.

Embodiment 2

Figure 2:
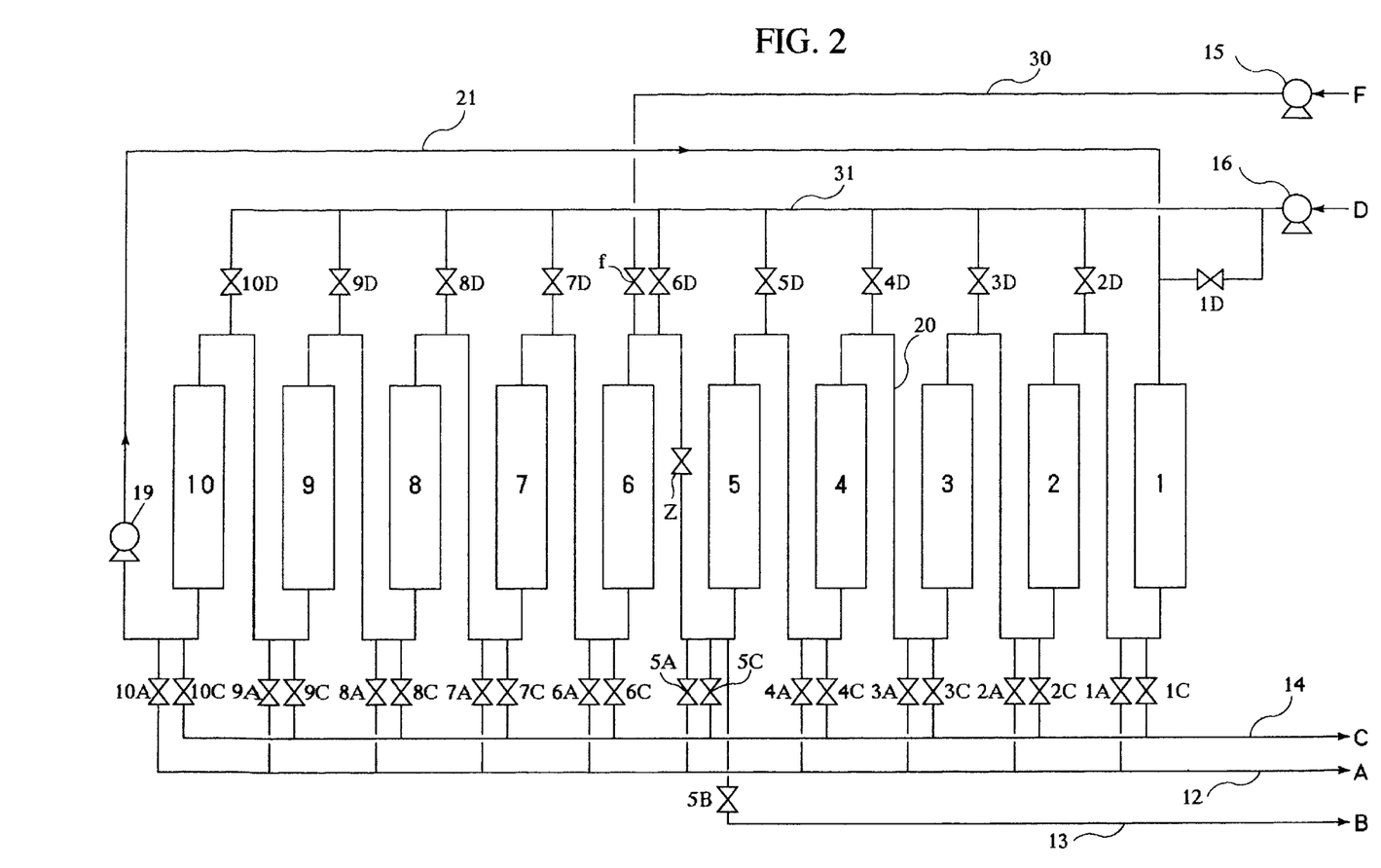
FIG. 2 is a schematic illustration of an example of the constitution of an altered simulated moving bed chromatographic separator capable of separation of 3 components.

FIG. 2 is a schematic illustration of an example of the constitution of an altered simulated moving bed chromatographic separator capable of separation of 3 components. In FIG. 2, the same symbols as in FIG. 1 are attached to those corresponding to constituent elements and the like as in FIG. 1, except that B denotes a fluid of fraction B enriched with a medium-affinity component B (fluid fraction B), while 5B refers to a fraction B withdrawal valve, f to a starting fluid material feed valve, 13 to a fraction B withdrawal piping, and Z to a shutoff valve.

In FIG. 2, the ends of packing bed units 1 to 10 are endlessly linked with the tops of the respective next packing bed units by means of connecting pipings 20 and 21. Fraction A withdrawal valves 1A to 10A and fraction C withdrawal valves 1C to 10C are connected to the connecting pipings on the downstream sides of the respective packing bed units, and the fraction B withdrawal valve 5B is connected to the connecting pipe on the downstream side of the packing bed unit 5, while connecting branch pipes having respective desorbent feed valves 1D to 10D and branched from a desorbent feed piping 31 for desorbent being fed by a desorbent feed pump 16 with the connecting piping on the upstream sides of the respective packing bed units and connecting a starting fluid material feed piping 30 having the starting fluid material feed valve f for a starting fluid material being fed by a starting fluid material feed pump 15 with the connecting piping on the upstream side of the packing bed unit 6. A circulating pump 19 is connected to the middle of the piping 21 extended from the end of the packing bed unit 10 to the top of the packing bed unit 1. The fraction B withdrawal valve 5B is connected to the fraction B withdrawal piping 13. The fraction A withdrawal valves 1A to 10A are connected to the fraction A withdrawal piping 12, while the fraction C withdrawal valves 1C to 10C are connected to the fraction C withdrawal piping 14. Further, the shutoff valve Z is provided in the connecting piping between the packing bed units 5 and 6. The altered simulated moving bed chromatographic separator is thus constructed.

In the instance of FIG. 2, the fraction B withdrawal valve 5B is connected to the connecting piping 20 on the downstream side of the packing bed unit 5 without any packing bed unit therebetween on the upstream side of the shutoff valve Z, and also connected to the fraction B withdrawal piping 13. Alternatively, however, the fraction B withdrawal valve may be connected to the connecting piping 20 on the downstream side of the packing bed unit 4 via the one packing bed unit 5 therebetween on the upstream side of the shutoff valve Z, and also connected to the fraction B withdrawal piping 13. In the latter case, the zone "at least between the position of feeding the starting fluid material to the packing bed and the position of withdrawing the component having a medium affinity for packing from the packing bed" covers the packing bed units 6, 7, 8, 9, 10, 1, 2, 3 and 4 except for the packing bed unit 5.

The circulating pump 19, which is installed in the middle of the piping 21, is capable of controlling the flow rate to any set points in accordance with a flow rate sequence program with the aid of a controller not shown in the figure. This circulating pump 19 may be installed between any mutually adjacent packing bed units, and whatever number of such pumps may be provided as needed. Further, the feed valves and the withdrawal valves are each controlled to be opened or closed in accordance with a predetermined valve opening and closing sequence program by means of the controller not shown in the figure. Although the number of packing bed units is 10 in FIG. 2, it is not limited thereto.

The shutoff valve Z provided in the connecting piping between the packing bed units 5 and 6, the number of which is not limited to one, is controlled to be opened or closed by the controller not shown in the figure. Two or more such shutoff valves may alternatively be provided at different positions in the circulation flow path according to the purpose.

A description will now be made of a case where a starting fluid material containing at least 3 components (components A, B and C) is separated into 3 fractions enriched with respective components using the separator having the constitution of FIG. 2 in 2 steps while effectively taking advantage of the shutoff valve Z. In this case, the affinities for chromatographic packing are in the following order: component C>component B>component A.

In Step 1 (corresponding to "Stage 1" in Example of this Embodiment 2 and Comparative Examples), while in a state wherein the shutoff valve Z is closed and the starting fluid material feed valve f is opened, the starting fluid material F is fed via the starting fluid material feed valve f from the top of the packing bed unit 6 wherein a sorption zone enriched with the component A is formed, and a fraction A is withdrawn from the end of a packing bed unit 8 on the downstream side of the starting fluid material feed position via the fraction A withdrawal valve 8A being opened, and a fraction B is simultaneously withdrawn from the end of the packing bed unit 5 via the fraction B withdrawal valve 5B being opened with feeding desorbent D via the desorbent feed valve 1D being opened to the top of the packing bed unit 1 on the upstream side of the packing bed unit 5 wherein a sorption zone enriched with the component B is formed.

Incidentally, since the fraction A is withdrawn in the following Step 2 (corresponding to "Stages 2 to 10" in Example of this Embodiment 2 and Comparative Examples) as well, there may alternatively be adopted an embodiment wherein the fraction A is not withdrawn in Step 1 though it depends on the affinity of the component A for chromatographic packing. Inversely, there may alternatively be adopted an embodiment wherein a fraction C, or the fractions A and C are withdrawn in Step 1 if necessary. Where the component B having a medium affinity for chromatographic packing is composed of components $B_1$ and $B_2$ (affinity: component $B_1$<component $B_2$), there may also be an embodiment wherein a fraction $B_1$ enriched with the component $B_1$ and a fraction $B_2$ enriched with the component $B_2$ are sequentially withdrawn from the end of the packing bed unit 5 via the fraction B withdrawal valve 5B being opened. According to this embodiment, separation of 4 components is actually effected. Of course, there may alternatively be adopted an embodiment wherein a fraction enriched with the component B is withdrawn as a single fraction, which alone is then subjected, for example, either to substantially the same step as the following Step 2 or separation of 2 components according to the standard simulated moving bed chromatographic separation procedure to separate a fraction $B_1$ enriched with the component $B_1$ from a fraction $B_2$ enriched with the component $B_2$.

In Step 2 (corresponding to "Stages 2 to 10" in Example of this Embodiment 2 and Comparative Examples), the starting fluid material feed valve f is closed to stop feeding the starting fluid material, and the shutoff valve Z is opened to allow fluid circulation in the system comprising the packing bed units linked in endless series. Desorbent is fed to this system, and fractions of the remaining components (fractions A and C) are withdrawn from the ends of packing bed units wherein sorption zones enriched with the respective components left in Step 1 are formed, while performing an operation of sequentially displacing the desorbent feed position and the fraction withdrawal positions to those for packing bed units on the downstream side in the system in step with the movement of the sorption zones. How to perform such a displacement operation can be understood by reference to "Open Valves" in Stages 2 to 10 in the following Example 3 as a specific instance of the operation. In running an industrial-scale separator, Steps 1 and 2 as one cycle are usually repeated.

Step 1 is a step wherein the distribution of sorption zones of respective components to be withdrawn in the next cycle is formed by feeding the starting fluid material while withdrawing out of the system a fraction of the component classed as a medium-affinity component (fraction B) among fractions of components corresponding to already formed sorption zones, and wherein a large amount of the fluid fraction B can be removed in a short time. Incidentally, since it is not desired that fluid in the system flow into the starting fluid material feed position from the upstream side thereof in this step, the shutoff valve Z is provided as a means for mechanically ensuring shutoff of fluid circulation. Even if no shutoff valve is provided, however, fluid circulation can operationally be shut off by controlling the feed rate of the starting fluid material and the withdrawal rate of the fraction B.

Step 2 is a step wherein fractions enriched with respective components other than the component B are withdrawn out of the system while allowing fluid circulation in the system without feeding thereto the starting fluid material by an operation similar to the operation of the standard simulated moving bed chromatographic separation procedure, and wherein the components of the starting fluid material fed afresh into the system in Step 1 form sorption zones of the components sequentially separated and ranging from the component having the weak affinity for packing (sorbent) (component A) to the component having the strong affinity (component C). The procedure of this Step 2 is substantially the same as the standard simulated moving bed chromatographic separation procedure of separation of 2 components except for feeding no starting fluid material.

A difference between the basic operation of the aforementioned standard simulated moving bed chromatographic separation procedure of separation of 2 components and the operation of Step 2 of this Embodiment 2 lies in that components are not afresh flowed into the system with feeding no starting fluid material in Step 2 of this Embodiment 2 unlike in the former.

The procedure of Step 2 taken in accordance with the simulated moving bed operation of withdrawing 2 fractions while feeding desorbent, though not particularly limitative, may be any known conventional one except for feeding no starting fluid material, an example of which is a case where a starting solution is not fed in the method particularly described on page 2, right-upper column, line 2 to left-lower column, the last line, and shown in FIG. 3 in Japanese Patent Laid-Open No. 91,205/1987. Specifically, with circulating fluid in the system by means of a pump or the like, an operation of sequentially displacing in the downstream direction of circulating flow the position of feeding desorbent via the top of a packing bed unit on the most upstream side in a zone enriched with a strong-affinity component and the positions of simultaneously withdrawing fractions enriched with components from the ends of packing bed units on the respective most downstream sides in the zone enriched with the strong-affinity component and in a zone enriched with a weak-affinity component in step with movement of the zones is performed for a plurality of components other than a component having a medium affinity for chromatographic packing (sorbent).

Although the procedure of repeating Steps 1 and 2 has been described in connection with a state wherein the separator is continuously run, a preliminary step of performing only an operation of feeding the starting fluid material into the system to form sorption zones of components sequentially separated and ranging from the component having the weak affinity for chromatographic packing (sorbent) to the component having the strong affinity may be taken in order to start up the separator before Step 1.

Such Steps 1 and 2 as one cycle are fundamentally repeated. Needless to say, however, they can be taken according to a variety of altered embodiments.

For example, only the starting fluid material may be fed into the system without feeding desorbent in Step 1. When the starting fluid material and desorbent are simultaneously fed as described above, however, the feed rate of the starting fluid material and the withdrawal rate of the fraction B can be controlled (control of mass balance). Further, feeding desorbent can increase the flow velocity of fluid on the downstream side of the position of feeding it, whereby the moving velocity of a predetermined component in the sorption zone thereof can be arbitrarily chosen.

EXAMPLES

The following Examples will specifically illustrate the present invention in comparison with Comparative Examples, but, needless to say, should not be construed as limiting the scope of the present invention. Incidentally, in the following Examples and Comparative Examples, the solids-based composition is expressed in terms of areal percentage in high-performance liquid chromatography using a sodium-form ion exchange column and a differential refractometer, and the term "one cycle time" denotes the time required for completing all stages ranging from Stage 1 to Stage 10. Generally speaking, all stages can be repeated continuously through a plurality of cycles as needed without termination after only one cycle. Further, "L" stands for "liter(s)," and "Hr" stands for "hour(s)."

[1] (Simulated Moving Bed Chromatographic Separation for Obtaining 2 Fractions)

Example 1

A model solution (solids content: 60 wt. %; solids-based composition: 1.0% sucrose, 43.0% glucose, 44.0% fructose, 12.0% betaine) for a solution obtained by enzymolysis and demineralization of beet molasses was used as the starting solution, and the simulated moving bed chromatographic separator of FIG. 1 wherein cation exchange resins differing only in ionic form were packed as 2 packings in a coexistent state was run in order to separate a glucose+ fructose mixture and betaine from each other.

Amberlite CG-6000 (registered trademark of a gel type strongly acidic cation exchange resin for chromatographic separation) manufactured by Rohm and Haas Company was used as chromatographic packing. The cation exchange resin as one packing in the packing bed units 1, 3, 5, 7 and 9 was in the sodium form, while the cation exchange resin as the other packing in the other packing bed units 2, 4, 6, 8 and 10 was in the calcium form. The total amount of the packings packed in the 10 packing bed units was 147 L.

The resolution of fructose (strongest-affinity component of monosaccharides) and betaine by used packing was 0.76 for the cation exchange resin in the calcium form, and 0.30 for the cation exchange resin in the sodium form when measured at a temperature of 80° C. at a packing bed height of 1 m at a linear velocity of 5 m/Hr.

Other operating conditions were as follows:

Packed Column Units: 108 mm in inside diameter, 1600 mm in bed height, 10 in the number of packed column units Operating Temperature: 80° C.

One Cycle Time: 2.13 Hr

Linear Flow Velocity in Packed Column Units between Starting Solution Feed Inlet and Fraction C Withdrawal Outlet: 5.00 m/Hr Feed Rate of Starting Solution: 17.64 L/Hr (0.12 L/L -packings/Hr, based on packings)

Feed Rate of Eluent Water: 30.87 L/Hr

Withdrawal Rate of Fraction A: 26.75 L/Hr

Withdrawal Rate of Fraction C: 21.76 L/Hr

Eluent Water/Starting Solution (vol. ratio): 1.75

Open valves in each stage were as follows. Fed liquids and withdrawn solutions were common to all stages, wherein the starting solution and eluent water were fed and fractions A and C were withdrawn.

Stage 1 6F, 1D, 8A, 2C

Stage 2 7F, 2D, 9A, 3C

Stage 3 8F, 3D, 10A, 4C

Stage 4 9F, 4D, 1A, 5C

Stage 5 10F, 5D, 2A, 6C

Stage 6 1F, 6D, 3A, 7C

Stage 7 2F, 7D, 4A, 8C

Stage 8 3F, 8D, 5A, 9C

Stage 9 4F, 9D, 6A, 10C

Stage 10 5F, 10D, 7A, 1C

As a result of operation, there were obtained fractions A and C having respective solids contents and solids-based compositions as in the following Table 1.

TABLE 1

|  | Fraction A | Fraction C |
| --- | --- | --- |
| Content | 453 g/L | 73 g/L |
| Sucrose | 1.1% | 0.5% |
| Glucose | 48.7% | 0.0% |
| Fructose | 49.8% | 0.1% |
| Betaine | 0.4% | 99.4% |

Incidentally, the fructose recovery of the fraction A was 100.0%, and the betaine recovery of the fraction C was 96.8%.

Comparative Example 1

The same starting solution as in Example 1 was subjected to separation with the same separator as in Example 1 except that the cation exchange resin all in the calcium form was packed as packing. Operating conditions were set in tune with the calcium form of the cation exchange resin to be as follows:

Amberlite CG-6000 (gel type strongly acidic cation exchange resin for chromatographic separation) manufactured by Rohm and Haas Company was used as chromatographic packing. This cation exchange resin in the calcium form was packed in all the packing bed units. The total amount of the packing packed in the packing bed units was 147 L.

Other operating conditions were as follows:

Packed Column Units: 108 mm in inside diameter, 1600 mm in bed height, 10 in the number of packed column units Operating Temperature: 80° C.

One Cycle Time: 2.57 Hr

Linear Flow Velocity in Packed Column Units between Starting Solution Feed Inlet and Fraction C Withdrawal Outlet: 5.00 m/Hr Feed Rate of Starting Solution: 17.64 L/Hr (0.12 L/L-packing/Hr, based on packing)

Feed Rate of Eluent Water: 36.75 L/Hr

Withdrawal Rate of Fraction A: 30.87 L/Hr

Withdrawal Rate of Fraction C: 23.52 L/Hr

Eluent Water/Starting Solution (vol. ratio): 2.08

Open valves, fed liquids and withdrawn solutions in each stage were the same as in Example 1.

As a result of operation, there were obtained fractions A and C having respective solids contents and solids-based compositions as in the following Table 2.

TABLE 2

|  | Fraction A | Fraction C |
| --- | --- | --- |
| Content | 392 g/L | 68 g/L |
| Sucrose | 1.1% | 0.5% |
| Glucose | 48.7% | 0.4% |
| Fructose | 49.9% | 0.0% |
| Betaine | 0.3% | 99.1% |

Incidentally, the fructose recovery of the fraction A was 100.0%, and the betaine recovery of the fraction C was 97.6%.

Comparative Example 2

The same starting solution as in Example 1 was subjected to separation with the same separator as in Example 1 except that the cation exchange resin all in the sodium form was packed as packing. Operating conditions were set in tune with the sodium form of the cation exchange resin to be as follows:

Amberlite CG-6000 (gel type strongly acidic cation exchange resin for chromatographic separation) manufactured by Rohm and Haas Company was used as chromatographic packing. This cation exchange resin in the sodium form was packed in all the packing bed units. The total amount of the packing packed in the 10 packing bed units was 147 L.

Other operating conditions were as follows:

Packed Column Units: 108 mm in inside diameter, 1600 mm in bed height, 10 in the number of packed column units Operating Temperature: 80° C.

One Cycle Time: 1.94 Hr

Linear Flow Velocity in Packed Column Units between Starting Solution Feed Inlet and Fraction C Withdrawal Outlet: 5.00 m/Hr Feed Rate of Starting Solution: 7.35 L/Hr (0.05 L/L -packing/Hr, based on packing)

Feed Rate of Eluent Water: 16.17 L/Hr

Withdrawal Rate of Fraction A: 13.23 L/Hr

Withdrawal Rate of Fraction C: 10.29 L/Hr

Eluent Water/Starting Solution (vol. ratio): 2.20

Open valves, fed liquids and withdrawn solutions in each stage were the same as in Example 1.

As a result of operation, there were obtained fractions A and C having respective solids contents and solids-based compositions as in the following Table 3.

TABLE 3

|  | Fraction A | Fraction C |
|---|---|---|
| Content | 377 g/L | 71 g/L |
| Sucrose | 1.0% | 0.8% |
| Glucose | 49.4% | 0.3% |
| Fructose | 48.7% | 12.4% |
| Betaine | 0.9% | 86.5% |

Incidentally, the fructose recovery of the fraction A was 96.4%, and the betaine recovery of the fraction C was 92.8%.

As is understandable from the results of the foregoing Example 1 and Comparative Examples 1 and 2, even under such conditions that the amount of used eluent water was smaller by 16% than that in Comparative Example 1, substantially comparable fractions were obtained in Example 1 of the present invention, while there were obtained such results that the betaine purity and betaine recovery of the fraction C in Example 1 of the present invention were higher by 12.9% and 4%, respectively, than those in Comparative Example 2 despite a 2.4-fold increase in the feed rate of the starting solution.

In other words, use of the separator of Example 1, wherein the packing bed units packed with the cation exchange resin in the calcium form as a packing were arranged alternatively with the packing bed units packed with the cation exchange resin in the sodium form as a packing to provide a coexistent state of different packings as a whole across the simulated moving bed, could materialize a decrease in the amount of used eluent water, an increase in the load of the starting solution and improvements in purity and recovery as compared with use of the simulated moving bed separator having all the packing bed units packed with the cation exchange resin either in the calcium form alone or in the sodium form alone as a packing.

[2] (Batchwise Chromatographic Separation for Obtaining 2 Fractions)

Example 2

The same starting solution as in Example 1 was subjected to batchwise chromatographic separation to obtain fractions. The simulated moving bed chromatographic separator of FIG. 1 was packed with the sodium form and calcium form of the cation exchange resin in the same manner as in Example 1, and was run batchwise.

Amberlite CG-6000 (gel type strongly acidic cation exchange resin for chromatographic separation) manufactured by Rohm and Haas Company was used as chromatographic packing. The cation exchange resin as one packing in the packing bed units 1, 3, 5, 7 and 9 was in the sodium form, while the cation exchange resin as the other packing in the other packing bed units 2, 4, 6, 8 and 10 was in the calcium form. The total amount of the packings packed in the 10 packing bed units was 147 L.

Other operating conditions were as follows:

Packed Column Units: 108 mm in inside diameter, 1600 mm in bed height, 10 in the number of packed column units Operating Temperature: 80° C.

One Cycle Time: 3.0 Hr

Feed Rate of Starting Solution as well as Eluent Water: 36.75 L/Hr

Amount of Fed Starting Solution: 7.35 L (0.05 L/L-packings, based on packings)

Solids Content of Starting Solution: 60 wt. %

Starting Solution Feed Time: 0.20 Hr

Amount of Fed Eluent Water: 102.90 L

Amount of Withdrawn Fraction A: 58.80 L

Amount of Withdrawn Fraction C: 51.45 L

Eluent Water/Starting Solution (vol. ratio): 14

Open valves and time in each stage were as follows:

Stage 1 6F, 5A, 0.20 Hr

Stage 2 6D, 5C, 1.40 Hr

Stage 3 6D, 5A, 1.40 Hr

After 3 cycles, there were obtained fractions A and C having respective solids contents and solids-based compositions as in the following Table 4.

TABLE 4

|  | Fraction A | Fraction C |
|---|---|---|
| Content | 43 g/L | 7 g/L |
| Sucrose | 1.1% | 0.0% |
| Glucose | 48.8% | 0.0% |
| Fructose | 50.0% | 0.0% |
| Betaine | 0.1% | 100.0% |

Incidentally, the fructose recovery of the fraction A was 100.0%, and the betaine recovery of the fraction C was 99.3%.

Comparative Example 3

The same starting solution as in Example 1 was subjected to batchwise chromatographic separation to obtain fractions. The simulated moving bed chromatographic separator of FIG. 1 was packed with the cation exchange resin in the calcium form in the same manner as in Comparative Example 1, and was run batchwise.

Amberlite CG-6000 (gel type strongly acidic cation exchange resin for chromatographic separation) manufactured by Rohm and Haas Company was used as chromatographic packing. This cation exchange resin in the calcium form was packed in all the packing bed units. The total amount of the packing packed in the 10 packing bed units was 147 L.

Other operating conditions were as follows:

Packed Column Units: 108 mm in inside diameter, 1600 mm in bed height, 10 in the number of packed column units Operating Temperature: 80° C.

One Cycle Time: 4.0 Hr

Feed Rate of Starting Solution as well as Eluent Water: 36.75 L/Hr

Amount of Fed Starting Solution: 7.35 L (0.05 L/L packing, based on packing)

Starting Solution Feed Time: 0.20 Hr

Amount of Fed Eluent Water: 139.65 L

Amount of Withdrawn Fraction A: 66.15 L

Amount of Withdrawn Fraction C: 80.85 L

Eluent Water/Starting Solution (vol. ratio): 19

Open valves and time in each stage were as follows:

Stage 1 6F, 5C, 0.20 Hr

Stage 2 6D, 5C, 1.50 Hr

Stage 3 6D, 5A, 1.80 Hr

Stage 4 6D, 5C, 0.50 Hr

After 3 cycles, there were obtained fractions A and C having respective solids contents and solids-based compositions as in the following Table 5.

TABLE 5

|  | Fraction A | Fraction C |
| --- | --- | --- |
| Content | 38 g/L | 4 g/L |
| Sucrose | 1.1% | 0.0% |
| Glucose | 48.9% | 0.0% |
| Fructose | 50.0% | 0.0% |
| Betaine | 0.0% | 100.0% |

Incidentally, the fructose recovery of the fraction A was 100.0%, and the betaine recovery of the fraction C was 100.0%.

Comparative Example 4

The same starting solution as in Example 1 was subjected to batchwise chromatographic separation to obtain fractions. The simulated moving bed chromatographic separator of FIG. 1 was packed with the cation exchange resin in the sodium form in the same manner as in Comparative Example 2, and was run batchwise.

Amberlite CG-6000 (gel type strongly acidic cation exchange resin for chromatographic separation) manufactured by Rohm and Haas Company was used as chromatographic packing. This cation exchange resin in the sodium form was packed in all the packing bed units. The total amount of the packing packed in the 10 packing bed units was 147 L.

Other operating conditions were as follows:

Packed Column Units: 108 mm in inside diameter, 1600 mm in bed height, 10 in the number of packed column units Operating Temperature: 80° C.

One Cycle Time: 1.8 Hr

Feed Rate of Starting Solution as well as Eluent Water: 36.75 L/Hr

Amount of Fed Starting Solution: 7.35 L
(0.05 L/L-packing, based on packing)

Starting Solution Feed Time: 0.20 Hr

Amount of Fed Eluent Water: 58.80 L

Amount of Withdrawn Fraction A: 44.10 L

Amount of Withdrawn Fraction C: 22.05 L

Eluent Water/Starting Solution (vol. ratio): 19

Open valves and time in each stage were as follows:

Stage 1 6F, 5A, 0.20 Hr

Stage 2 6D, 5A, 0.80 Hr

Stage 3 6D, 5C, 0.60 Hr

Stage 4 6D, 5A, 0.20 Hr

After 3 cycles, there were obtained fractions A and C having respective solids contents and solids-based compositions as in the following Table 6.

TABLE 6

|  | Fraction A | Fraction C |
| --- | --- | --- |
| Content | 60 g/L | 8 g/L |
| Sucrose | 1.1% | 0.0% |
| Glucose | 46.0% | 0.3% |
| Fructose | 46.7% | 4.4% |
| Betaine | 6.2% | 95.3% |

Incidentally, the fructose recovery of the fraction A was 99.4%, and the betaine recovery of the fraction C was 51.4%.

As is understandable from the results of the foregoing Example 2 and Comparative Examples 3 and 4, even under such conditions that the amount of used eluent water and the one cycle time were smaller by 26% than that and ¾ of that, respectively, in Comparative Example 3 wherein the cation exchange resin in the calcium form alone was used as packing, substantially comparable separated solutions were obtained in Example 2 of the present invention, while the monosaccharides purity of the fraction A, the betaine purity of the fraction C and the betaine recovery of the fraction C in Example 2 of the present invention were higher by 6.1%, 4.7% and 49.6%, respectively, than those in Comparative Example 4 wherein the cation exchange resin in the sodium form alone was used as packing.

In other words, use of the batchwise separator using a packing bed involving a substantially stratified coexistent state of different packings, wherein the packing bed units packed with the cation exchange resin in the calcium form as a packing were arranged alternatively with the packing bed units packed with the cation exchange resin in the sodium form as a packing, could materialize a decrease in the amount of used eluent water, a reduction of one cycle time and improvements in purity and recovery as compared with use of the batchwise separator using a packing bed packed either with the cation exchange resin in the calcium form alone or the cation exchange resin in the sodium form alone as a packing.

[3] (Altered Simulated Moving Bed Chromatographic Separation for Obtaining 3 Fractions)

Example 3

A solution (solids content: 60 wt. %; solids-based composition: 11.4% polysaccharides in the form of at least disaccharides and other unidentified components in total, 39.7% glucose, 40.6% fructose, 8.3% betaine) obtained by subjecting beet molasses to enzymolysis with invertase as sucrase and then to demineralization according to the ion exclusion method was separated as the starting solution with the simulated moving bed chromatographic separator of FIG. 2 for separation of at least 3 components which separator was packed with the cation exchange resin involving 30% of the calcium form, 49% of the potassium form and 21% of the sodium form as packing as a whole across the separator for the purpose of obtaining a mixed glucose+ fructose sugar solution, provided that the 49% potassium form and the 21% sodium form existed in a mixed ion form in grains of the cation exchange resin as described below.

Amberlite CG-6000 (gel type strongly acidic cation exchange resin for chromatographic separation) manufactured by Rohm and Haas Company was used as chromatographic packing. The cation exchange resin as the second packing in the packing bed units 1, 2 and 7 was in the calcium form, while the cation exchange resin as the first packing in the other packing bed units 3, 4, 5, 6, 8, 9 and 10 was in the mixed ion form of 70% potassium and 30% sodium. Incidentally, the cation exchange resin in this mixed ion form of potassium and sodium was obtained as a cation exchange resin in the mixed ion form of 70% potassium and 30% sodium equilibrated with the ionic form composition of a starting solution material (softened solution) during the course of chromatographic separation of saccharides from the softened solution of an aqueous saccharides solution derived from the plant (beet). The cation exchange resin in the calcium form in the packing bed units 1, 2 and 7 was one converted into the calcium form by flowing 44 L, per packing bed unit, of an aqueous calcium chloride solution having a concentration of 1 normal through the cation exchange resin in the above-mentioned mixed ion form. The total amount of the packings packed in the 10 packing bed units was 147 L.

The resolution of disaccharides and glucose by used packing was 0.30 for the cation exchange resin in the mixed ion form of monovalent ions (70% potassium form: 30% sodium form) as the first packing, and 0.27 for the cation exchange resin in the calcium form as the second packing when measured at a temperature of 60° C. at a packing bed height of 1 m at a linear velocity of 5 m/Hr. As is understandable by reference to the above-mentioned resolution by the first packing, disaccharides and monosaccharides such as glucose can be well separated from each other by nature if use is made of a strongly acidic cation exchange resin in the monovalent ion form. If only both are to be separated from each other, therefore, a coexistent state of the first and second packings may not necessarily be required. On the other hand, the resolution of fructose (stronger-affinity component eluted later than glucose among monosaccharides from an experimental chromatographic column) and betaine was 0.03 for the cation exchange resin in the mixed monovalent ion form as the first packing, and 0.76 for the cation exchange resin in the calcium form as the second packing. Accordingly, this Example was aimed at improving separation of monosaccharides such as fructose and betaine because of poor separation thereof by the first packing, and at attaining well-balanced separation of monosaccharides, disaccharides and others, and betaine considered 3 components with as small an amount of eluent water as possible.

Other operating conditions were as follows:

Packed Column Units: 108 mm in inside diameter, 1600 mm in bed height, 10 in the number of packed column units Operating Temperature: 60° C.

One Cycle Time: 2.25 Hr

In Stage 1 (Step 1),

Time Required in Stage 1: 0.45 Hr

Feed Rate of Starting Solution: 16.54 L/Hr
(average 0.0223 L/L-packings/Hr, based on packings and one cyde time)

Feed Rate of Eluent Water: 57.15 L/Hr

Withdrawal Rate of Fraction A: 9.91 L/Hr

Withdrawal Rate of Fraction B: 64.50 L/Hr

In Stages 2 to 10 (Step 2),

Linear Flow Velocity in Packed Column Units between Fraction A Withdrawal Outlet and Fraction C Withdrawal Outlet: 5.00 m/Hr Feed Rate of Eluent Water: 46.31 L/Hr Withdrawal Rate of Fraction A: 16.54 L/Hr Withdrawal Rate of Fraction C: 29.77 L/Hr Eluent Water/Starting Solution (vol. ratio): 9.7

Open valves in each stage were as follows:

Stage 1 f, 1D, 8A, 5B
(starting solution feed, eluent water feed, fraction A withdrawal, fraction B withdrawal)

Stage 2 2D, 9A, 3C, Z
(eluent water feed, fraction A withdrawal, fraction C withdrawal)

Stage 3 3D, 10A, 4C, Z
(eluent water feed, fraction A withdrawal, fraction C withdrawal)

Stage 4 4D, 1A, 5C, Z
(eluent water feed, fraction A withdrawal, fraction C withdrawal)

Stage 5 5D, 2A, 6C, Z
(eluent water feed, fraction A withdrawal, fraction C withdrawal)

Stage 6 6D, 3A, 7C, Z
(eluent water feed, fraction A withdrawal, fraction C withdrawal)

Stage 7 7D, 4A, 8C, Z
(eluent water feed, fraction A withdrawal, fraction C withdrawal)

Stage 8 8D, 5A, 9C, Z
(eluent water feed, fraction A withdrawal, fraction C withdrawal)

Stage 9 9D, 6A, 10C, Z
(eluent water feed, fraction A withdrawal, fraction C withdrawal)

Stage 10 10D, 7A, 1C, Z
(eluent water feed, fraction A withdrawal, fraction C withdrawal)

In Stage 1 (Step 1), the starting solution F was fed to the packing bed unit 6 via the starting solution feed valve f positioned on the downstream side of the closed shutoff valve Z while simultaneously feeding eluent water D via the eluent water feed valve 1D, whereby a fraction B was withdrawn via the withdrawal valve 5B positioned on the upstream side of the shutoff valve Z while withdrawing a fraction A via the withdrawal valve 8A. By contrast, in Stages 2 to 10 (Step 2), with the shutoff valve Z being opened and feed of the starting solution being stopped, feed of eluent water and withdrawal of fractions A and C were done while sequentially displacing the eluent water feed position and the fractions A and C withdrawal positions in the downstream direction.

As a result of operation, there were obtained fractions A, B and C having respective solids contents and solids-based compositions as in the following Table 7.

TABLE 7

|  | Fraction A | Fraction B | Fraction C |
| --- | --- | --- | --- |
| Content | 31 g/L | 160 g/L | 17 g/L |
| Disaccharides and Others | 98.8% | 0.6% | 0.1% |
| Glucose | 0.5% | 49.3% | 0.1% |
| Fructose | 0.0% | 49.5% | 10.7% |
| Betaine | 0.7% | 0.6% | 89.1% |

Incidentally, the glucose recovery and fructose recovery of the fraction B were 99.8% and 97.6%, respectively, and the betaine recovery of the fraction C was 93.8%.

Comparative Example 5

The same starting solution as in Example 3 was separated at the same temperature with the same separator wherein the packing in all the packing bed units was the cation exchange resin still in a mixed ion form of potassium and sodium. Operating conditions were set in tune with the mixed ion form composition of the cation exchange resin to be as follows. Since the same amount of eluent water as used in Example 3 is wasteful particularly because of fast elution of betaine, the amount of used eluent water was decreased.

Amberlite CG-6000 (gel type strongly acidic cation exchange resin for chromatographic separation) manufactured by Rohm and Haas Company was used as chromatographic packing. The cation exchange resin in all the packing bed units was in a mixed ion form of 70% potassium and 30% sodium. Incidentally, the cation exchange resin in this mixed ion form of potassium and sodium, which was obtained as a cation exchange resin in the mixed ion form having an ionic form composition equilibrated with the ionic form composition of a starting solution material (softened solution) during the course of chromatographic separation of saccharides from the softened solution of an aqueous saccharides solution derived from the plant (beet), was used as such. The total amount of the packing packed in the 10 packing bed units was 147 L.

Other operating conditions were as follows:
Packed Column Units: 108 mm in inside diameter, 1600 mm in bed height, 10 in the number of packed column units
Operating Temperature: 60° C.
One Cycle Time: 2.24 Hr
In Stage 1 (Step 1),
 Time Required in Stage 1: 0.32 Hr
 Feed Rate of Starting Solution: 22.95 L/Hr
  (average 0.0223 L/L-packing/Hr, based on packing and one cycle time)
 Feed Rate of Eluent Water: 55.13 L/Hr
 Withdrawal Rate of Fraction A: 9.19 L/Hr
 Withdrawal Rate of Fraction B: 68.91 L/Hr
In Stages 2 to 10 (Step 2),
 Linear Flow Velocity in Packed Column Units between Fraction A Withdrawal Outlet and Fraction C Withdrawal Outlet: 5.00 m/Hr
 Feed Rate of Eluent Water: 24.66 L/Hr
 Withdrawal Rate of Fraction A: 17.61 L/Hr
 Withdrawal Rate of Fraction C: 7.05 L/Hr
 Eluent Water/Starting Solution (vol. ratio): 5.8
Open valves, fed liquids and withdrawn solutions in each stage were the same as in Example 3.

As a result of operation, there were obtained fractions A, B and C having respective solids contents and solids-based compositions as in the following Table 8.

TABLE 8

|  | Fraction A | Fraction B | Fraction C |
| --- | --- | --- | --- |
| Content | 31 g/L | 225 g/L | 16 g/L |
| Disaccharides and Others | 98.8% | 0.5% | 0.3% |
| Glucose | 1.0% | 45.4% | 0.2% |
| Fructose | 0.1% | 45.4% | 60.4% |
| Betaine | 0.1% | 8.7% | 39.1% |

Incidentally, the glucose recovery and fructose recovery of the fraction B were 99.7% and 97.0%, respectively, and the betaine recovery of the fraction C was 9.3%.

Comparative Example 6

The same starting solution as in Example 3 was separated at the same temperature with the same separator wherein all the packing in all the packing bed units was converted into the cation exchange resin in the calcium form. Operating conditions were set in tune with the ionic form of he cation exchange resin to be as follows. Since use of only the same amount of eluent water as used in Example 3 gives rise to shortage of eluent water and hence to mixing of betaine in fraction A particularly because of slow elution of betaine, the amount of used eluent water was increased.

Amberlite CG-6000 (gel type strongly acidic cation exchange resin for chromatographic separation) manufactured by Rohm and Haas Company was used as chromatographic packing. All the cation exchange resin in all the packing bed units was in the calcium form. Incidentally, the cation exchange resin in the calcium form was one converted into the calcium form by flowing 44 L per packing bed unit, of an aqueous calcium chloride solution having a concentration of 1 normal through the cation exchange resin, which was obtained as a cation exchange resin in the mixed ion form having an ionic form composition equilibrated with the ionic form composition of a starting solution material during the course of chromatographic separation of saccharides from the softened solution of an aqueous saccharides solution derived from the plant (beet). The total amount of the packing packed in the 10 packing bed units was 147 L.

Other operating conditions were as follows:
Packed Column Units: 108 mm in inside diameter, 1600 mm in bed height, 10 in the number of packed column units
Operating Temperature: 60° C.
One Cycle Time: 2.36 Hr
In Stage 1 (Step 1),
 Time Required in Stage 1: 0.56 Hr
 Feed Rate of Starting Solution: 13.78 L/Hr
  (average 0.0223 L/L-packing/Hr, based on packing and one cycle time)
 Feed Rate of Eluent Water: 51.45 L/Hr
 Withdrawal Rate of Fraction A: 10.11 L/Hr
 Withdrawal Rate of Fraction B: 55.12 L/Hr
In Stages 2 to 10 (Step 2),
 Linear Flow Velocity in Packed Column Units between Fraction A Withdrawal Outlet and Fraction C Withdrawal Outlet: 5.00 m/Hr
 Feed Rate of Eluent Water: 89.30 L/Hr
 Withdrawal Rate of Fraction A: 18.19 L/Hr
 Withdrawal Rate of Fraction C: 71.11 L/Hr
 Eluent Water/Starting Solution (vol. ratio): 15.3
Open valves, fed liquids and withdrawn solutions in each stage were the same as in Example 3.

As a result of operation, there were obtained fractions A, B and C having respective solids contents and solids-based compositions as in the following Table 9.

TABLE 9

|  | Fraction A | Fraction B | Fraction C |
| --- | --- | --- | --- |
| Content | 27 g/L | 157 g/L | 7 g/L |
| Disaccharides and Others | 98.0% | 1.1% | 0.0% |
| Glucose | 0.8% | 48.7% | 0.1% |
| Fructose | 0.0% | 49.9% | 1.3% |
| Betaine | 1.2% | 0.3% | 98.6% |

Incidentally, the glucose recovery and fructose recovery of the fraction B were 99.8% and 99.7%, respectively, and the betaine recovery of the fraction C was 95.7%.

In comparison of Example 3 with Comparative Example 5, although the amount of eluent water used in Example 3 was increased by 69% over that in Comparative Example 5, the betaine concentration and total glucose+fructose purity of the fraction B were lower only by 8.1% and higher by 8.0%, respectively, than those in Comparative Example 5, while the betaine purity of the fraction C was as high as 89.1% in Example 3 as against a low value of 39.1% in Comparative Example 5, whereby high-purity betaine could be recovered. In other words, converting 30% of the ionic form of the cation exchange resin into the calcium form to provide a coexistent state of 2 packings when the packing bed was viewed as a whole increased the amount of used eluent water, but so greatly improved separation of monosaccharides (glucose+fructose) from betaine that a desired high-purity mixed glucose+fructose sugar solution could be recovered at a high recovery due to necessary and sufficient adjustment of the resolution as a whole.

In comparison of Example 3 with Comparative Example 6, the betaine purity and betaine recovery of the fraction C were lower only by 9.5% and only by 1.9%, respectively, than those in Comparative Example 6. These differences are not great problems when consideration is given to the necessity of a crystallization step for obtaining betaine. Moreover, in Example 3, there were attained a decrease of 36% in the amount of used eluent water and an increase of 0.2% in the total glucose+fructose purity of the fraction B as against those in Comparative Example 6. In other words, converting only 30% of the ionic form of the cation exchange resin into the calcium form to provide a coexistent state of 2 packings when the packing bed was viewed as a whole enabled a desired high-purity mixed glucose+fructose sugar solution to be recovered without an extreme increase in the amount of used eluent water due to necessary and sufficient adjustment of the resolution of monosaccharides (glucose+fructose) and betaine.

INDUSTRIAL APPLICABILITY

In the standard simulated moving bed chromatographic separation process for separating components desired to be separated from a starting fluid material, such as a starting solution material, containing at least 2 components into 2 fractions, use of at least 2 different packings differing in resolution in a coexistent state according to the present invention adjusts the resolution as a whole across a packing bed, whereby the amount of used desorbent such as eluent can be reduced as compared with that in the case of using a well-separating packing while attaining an increase in the load of the starting fluid material and improvements in purity and recovery as against those in the case of using a poorly-separating packing.

Also in batchwise chromatographic separation, use of at least 2 different packings differing in resolution in a coexistent state according to the present invention adjusts the resolution as a whole across a packing bed, whereby the amount of used desorbent such as eluent and the time can be reduced as compared with those in the case of using a well-separating packing while attaining an increase in the load of a starting fluid material and improvements in purity and recovery as against those in the case of using a poorly-separating packing.

In chromatographic separation for separating a starting fluid material containing at least 3 components into at least 3 fractions enriched with respective components, use of at least 2 packings differing in resolution in a coexistent state according to the present invention at least between the position of feeding the starting fluid material to a packing bed and the position of withdrawing a component having a medium affinity for packing from the packing bed adjusts the resolution as a whole across the packing bed to make possible a decrease in the amount of used desorbent such as eluent, increases in the purities of desired substances, increases in the recoveries of the desired substances, and the like.

Particularly in the case of separating 3 components with a 3-component separation chromatographic separator, mutual separation of too well separable components and mutual separation of hardly separable components can both be effectively adjusted to proper degrees of separation according to the present invention.

In the aforementioned conventional chromatographic separation methods, it is conceivable to use as eluent a mixed liquid of, e.g., ethanol and water, having a suitable composition, in order to decrease the amount of, e.g., eluent to be used as desorbent. However, this measure involves a problem of inapplicability thereof to a case where eluent other than a single solvent such as water cannot be used. By contrast, the process of the present invention can advantageously decrease the amount of eluent to be used even if it is a single pure substance.

The chromatographic separation process and separator of the present invention, which can be used either according to a batchwise mode or according to a simulated moving bed mode, can advantageously be used in various fields of industries, including the sugar refining industry to which Examples pertain.

What is claimed is:

1. A chromatographic separation process for chromatographic separation comprising passing a starting fluid material containing at least 3 components differing in affinity for chromatographic packing and ranging from a strong-affinity component to a weak-affinity component through a packing bed while using desorbent to separate said at least 3 components into at least 3 fractions;

characterized in that at least 2 packings comprising at least one ion exchanger and differing in the resolution of the components are used as chromatographic packing in contact with a fluid containing a component having a medium affinity for chromatographic packing at least between the position of feeding said starting fluid material to said packing bed and the position of withdrawing said component having the medium affinity for chromatographic packing from said packing bed between which positions at least a first packing high in the resolution of said component having the medium affinity for chromatographic packing and the component having a weak affinity for chromatographic packing and a second packing high in the resolution of the component having a strong affinity for chromatographic packing and said component having the medium affinity for chromatographic packing are combined in a coexistent state to adjust the resolutions of the components.

2. A chromatographic separation process as claimed in claim 1 for altered simulated moving bed chromatographic separation comprising Step 1 comprising an operation of substantially shutting off fluid circulation in at least one position (shutoff/opening position) of the circulating flow path of a system of the group of a plurality of packing bed units packed with chromatographic packing and linked endlessly for formation of said circulation flow path, in said at least one shutoff/opening position of which an interchange can be made between a state wherein fluid is endlessly circulated through said circulation flow path with external fluid feed thereinto and outward fluid withdrawal therefrom and a state wherein fluid circulation is substantially shut off with external fluid feed thereinto and outward fluid withdrawal therefrom, and feeding a starting fluid material to a packing bed unit closest to said at least one shutoff/opening position on the downstream side thereof to flow it in one direction while withdrawing a fraction enriched with a component having a medium affinity for the chromatographic packing and contained in said starting fluid material out of said system, and Step 2 comprising an operation of withdrawing fractions enriched with components other than said component having the medium affinity for the chromatographic packing out of said system while feeding desorbent and flowing it in one direction and an operation of intermittently displacing the position of feeding said desorbent and the positions of withdrawing said fractions enriched with said components other than said component having the medium affinity for the chromatographic packing in the direction of fluid flow for apparently moving the chromatographic packing in the direction opposite to that of fluid flow;

characterized in that at least 2 different packings comprising at least one ion exchanger and differing in the resolution of components to be separated are combined in a coexistent state for use as the chromatographic packing at least between the position of feeding said starting fluid material and the position of withdrawing said fraction enriched with said component having the medium affinity for the chromatographic packing.

3. A chromatographic separation process as claimed in claim 2, characterized in that the packings differing in the resolution are 2 packings, one of which is a strongly acidic cation exchange resin in a monovalent ion form, and the other of which is a strongly acidic cation exchange resin in a bivalent ion form.

4. A chromatographic separation process as claimed in claim 2, characterized in that said starting fluid material is a starting solution material and at least one of said at least 2 packings is an ion exchanger, and in that separation is operated under such conditions that a solution being subjected to separation treatment is not substantially varied in ionic form composition from said starting solution material.

5. A chromatographic separation process as claimed in claim 1, characterized in that said coexistent state of at least 2 different packings combined and differing in the resolution of at least 2 components to be separated is a mixed state of said at least 2 packings in said packing bed or a stratified state of said at least 2 packings in said packing bed.

6. A chromatographic separation process as claimed claim 1, characterized in that said coexistent state of at least 2 different packings combined and differing in the resolution of at least 2 components to be separated is provided by connecting a plurality of packing bed units to constitute said packing bed while singly using at least one packing of said at least 2 different packings in at least one packing bed unit in such a way that a coexistent state of said at least 2 different packings is attained when said packing bed is viewed as a whole.

* * * * *